US012682403B2

(12) United States Patent (10) Patent No.: US 12,682,403 B2
Sariga et al. (45) Date of Patent: Jul. 14, 2026

(54) METHOD AND SYSTEM FOR AUTOMATED COST DUPLICATION DETECTION AND CORRECTION

(71) Applicant: Revenew International L.L.C., Houston, TX (US)

(72) Inventors: Gopan Sariga, Houston, TX (US); Jody Clement, Fulshear, TX (US)

(73) Assignee: Revenew International L.L.C., Houston, TX (US)

( * ) Notice: Subject to any disclaimer, the term of this patent is extended or adjusted under 35 U.S.C. 154(b) by 427 days.

(21) Appl. No.: 17/970,294

(22) Filed: Oct. 20, 2022

(65) Prior Publication Data

US 2024/0135462 A1 Apr. 25, 2024
US 2024/0233036 A9 Jul. 11, 2024

(51) Int. Cl.
*G06Q 40/12* (2023.01)
*G06F 16/215* (2019.01)

(52) U.S. Cl.
CPC ........... *G06Q 40/12* (2013.12); *G06F 16/215* (2019.01)

(58) Field of Classification Search
CPC .............................. G06Q 40/12; G06F 16/215
See application file for complete search history.

(56) References Cited

U.S. PATENT DOCUMENTS

| | | | |
|---|---|---|---|
| 2015/0332414 A1* | 11/2015 | Unser | G06F 16/285 705/30 |
| 2021/0304266 A1* | 9/2021 | Prasad | G06Q 10/107 |
| 2022/0027876 A1* | 1/2022 | Zhou | G06N 20/00 |

OTHER PUBLICATIONS

Brownlee, "How to Choose a Feature Selection Method For Machine Learning", Aug. 2020 https://machinelearningmastery.com/feature-selection-with-real-and-categorical-data/ (Year: 2020).*
"Improving your machine learning models by adding features", Jun. 2020, https://web.archive.org/web/20200804161715/https://www.avaus.com/blog/improving-your-machine-learning-models-by-adding-features/,hereinafter "Avanus" (Year: 2020).*
Xu, "Common Methods for Feature Selection You should Know", 2018, https://medium.com/@cxu24/common-methods-for-feature-selection-you-should-know-2346847fdf31 (Year: 2018).*
Aporras, "What is the difference between feature extraction and feature selection?", Nov. 14, 2019, https://quantdare.com/what-is-the-difference-between-feature-extraction-and-feature-selection/ (Year: 2019).*

(Continued)

*Primary Examiner* — Allen C Chein
(74) *Attorney, Agent, or Firm* — Kilpatrick Townsend & Stockton LLP

(57) ABSTRACT

Techniques for automated cost duplication detection and correction are described. In an example, a set of demand reports including data fields common to the set are received. A first subset of features are extracted from each demand report. A plurality of duplicate report groups are generated based on a comparison of the first subset of features extracted from each demand report. For each duplicate report group, a trained machine learning model is executed on a second subset of features extracted from the duplicate report group to generate a score representing a probability that the demand reports in the duplicate report group are valid duplicates. Depending on the score, an audit action sequence for the duplicate report group is generated.

18 Claims, 7 Drawing Sheets

(56) References Cited

OTHER PUBLICATIONS

Brown, "Machine learning, explained", Apr. 21, 2021, https://mitsloan.mit.edu/ideas-made-to-matter/machine-learning-explained (Year: 2021).*

Karegowda, "Feature Subset Selection Problem using Wrapper Approach in Supervised Learning", 2010 (Year: 2010).*

* cited by examiner

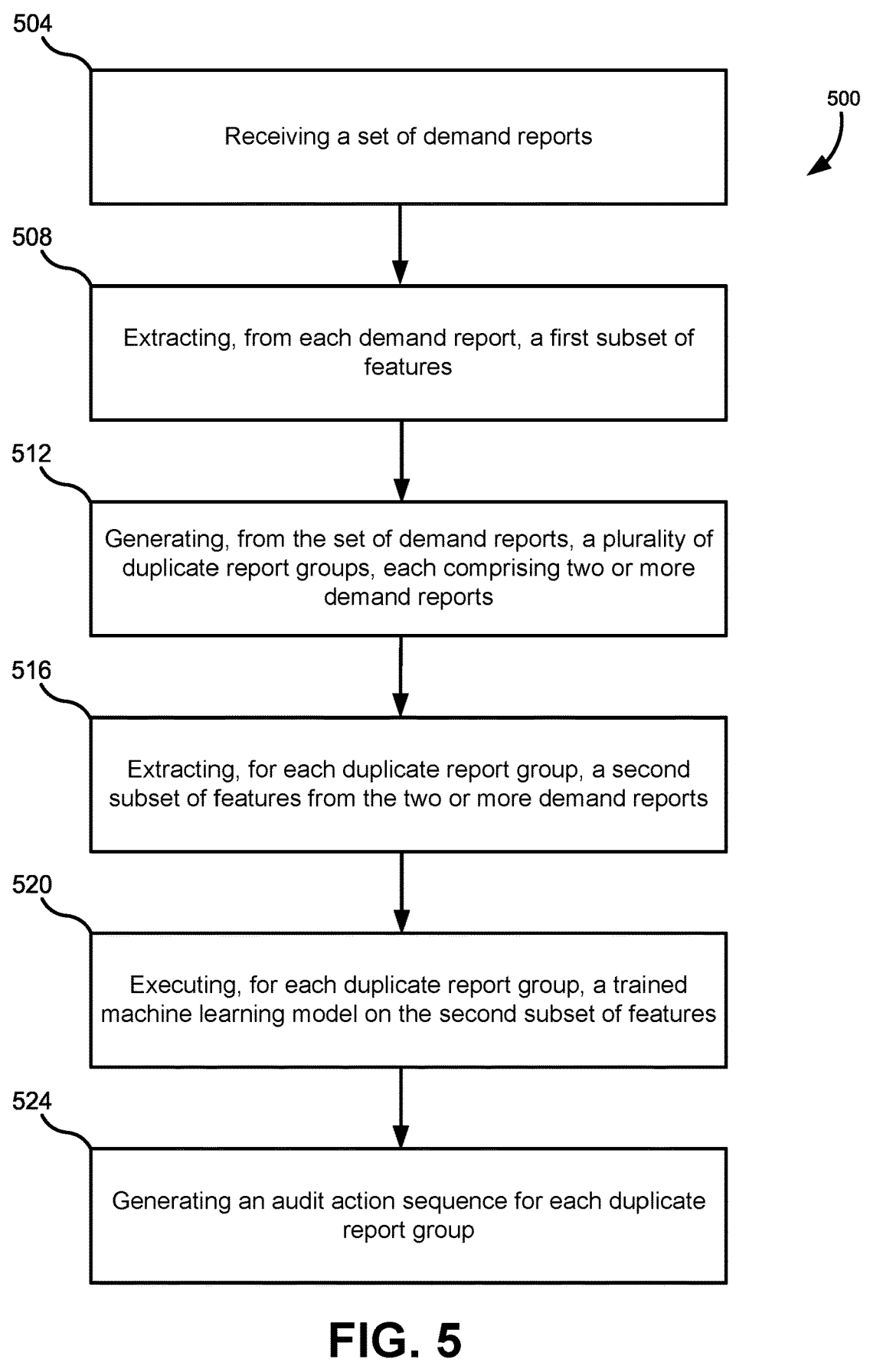

504

500

Receiving a set of demand reports

508

Extracting, from each demand report, a first subset of features

512

Generating, from the set of demand reports, a plurality of duplicate report groups, each comprising two or more demand reports

516

Extracting, for each duplicate report group, a second subset of features from the two or more demand reports

520

Executing, for each duplicate report group, a trained machine learning model on the second subset of features

524

Generating an audit action sequence for each duplicate report group

FIG. 5

METHOD AND SYSTEM FOR AUTOMATED COST DUPLICATION DETECTION AND CORRECTION

BACKGROUND

Correcting duplicate costs can be extremely important to improving the overall profitability of a business organization. However, detecting the duplicate costs in the first place can be difficult. Embodiments detailed herein provide effective arrangements for detecting and correcting duplicate costs.

SUMMARY

Various embodiments are described related to automated cost duplication detection and correction. In some embodiments, a method is described. The method may comprise receiving a set of demand reports, wherein each demand report of the set of demand reports includes data fields common to the set of demand reports. The method may further comprise extracting, from each demand report of the set of demand reports, a first subset of features from the data fields. The method may further comprise generating, from the set of demand reports, a plurality of duplicate report groups, wherein each duplicate report group of the plurality of duplicate report groups comprises two or more demand reports identified as being potential duplicates based on a comparison of the first subset of features extracted from the two or more demand reports. For each duplicate report group of the plurality of duplicate report groups, the method may further comprise extracting, from the two or more demand reports, a second subset of features. The method may further comprise executing a trained machine learning model on the second subset of features to generate a score representing a probability that the two or more demand reports are valid duplicates. The method may further comprise generating, based on a determination that the score is greater than a predefined score threshold, an audit action sequence for the duplicate report group.

In some embodiments, the first subset of features are extracted from data fields comprising: a vendor identification data field, an invoice date data field, an invoice number data field, and an invoice amount data field. In some embodiments, each demand report of the set of demand reports is associated with a respective vendor of a plurality of vendors and the method further comprises generating, for each respective vendor of the plurality of vendors, a respective vendor profile comprising a plurality of statistical features extracted from the demand reports associated with the respective vendor.

In some embodiments, each duplicate report group of the plurality of duplicate report groups is associated with a respective vendor of the plurality of vendors and the second subset of features comprises one or more deviations from the plurality of statistical features of the respective vendor profile. In some embodiments, the plurality of statistical features comprises at least one statistical feature selected from the group consisting of: an average invoice length, an average invoice number, a prevalence of dashes in invoice numbers, and an average invoice number length.

Embodiments of such a method may further comprise obtaining a plurality of validated report groups, wherein each validated report group of the plurality of validated report groups is associated with a respective classification of a plurality of classifications indicating whether or not a validated report group includes one or more duplicate demand reports. The method may further comprise extracting, from the plurality of validated report groups, a plurality of features. The method may further comprise generating, for each feature of the plurality of features, a corresponding predictive power value indicating a correlation between a respective feature of the plurality of features and the plurality of classifications. The method may further comprise extracting the second subset of features corresponding to features having highest predictive power values from the plurality of features. The method may further comprise generating the trained machine learning model using the second subset of features extracted from a subset of the plurality of validated report groups. The method may further comprise verifying an accuracy of the trained machine learning model using the second subset of features extracted from a remainder of the plurality of validated report groups and the associated plurality of classifications.

In some embodiments, a computer system is described. The computer system may include one or more processors and one or more memories storing computer-readable instructions that, upon execution by the one or more processors, configure the computer system to receive a set of demand reports, wherein each demand report of the set of demand reports includes data fields common to the set of demand reports. The computer system may be further configured to extract, from each demand report of the set of demand reports, a first subset of features from the data fields. The computer system may be further configured to generate, from the set of demand reports, a plurality of duplicate report groups, wherein each duplicate report group of the plurality of duplicate report groups comprises two or more demand reports identified as being potential duplicates based on a comparison of the first subset of features extracted from the two or more demand reports. For each duplicate report group of the plurality of duplicate report groups, the computer system may be further configured to extract, from the two or more demand reports, a second subset of features. The computer system may be further configured to execute a trained machine learning model on the second subset of features to generate a score representing a probability that the two or more demand reports are valid duplicates. The computer system may be further configured to generate, based on a determination that the score is greater than a predefined score threshold, an audit action sequence for the duplicate report group.

In some embodiments, the computer-readable instructions further configure the computer system to obtain the set of demand reports from one or more external computer systems. In some embodiments, the audit action sequence includes one or more procedures to determine a duplicate amount represented by the duplicate report group, and the computer-readable instructions further configure the computer system to present, at a display communicatively coupled with the computer system, the one or more procedures to a user.

In some embodiments, the first subset of features are extracted from data fields comprising: a vendor identification data field, an invoice date data field, an invoice number data field, and an invoice amount data field. In some embodiments, each demand report of the set of demand reports is associated with a respective vendor of a plurality of vendors, and the computer-readable instructions further configure the computer system to generate, for each respective vendor of the plurality of vendors, a respective vendor profile comprising a plurality of statistical features extracted from the demand reports associated with the respective vendor. In some embodiments, each duplicate report group of the plurality of duplicate report groups is associated with a respective vendor of the plurality of vendors and the second subset of features comprises one or more deviations from the plurality of statistical features of the respective vendor profile. In some embodiments, the plurality of statistical features comprises at least one statistical feature selected from the group consisting of: an average invoice length, an average invoice number, a prevalence of dashes in invoice numbers, and an average invoice number length.

In some embodiments, one or more non-transitory computer-readable storage media are described. The one or more non-transitory computer-readable storage media may store instructions that, upon execution on a computer system, cause the computer system to perform operations including receiving a set of demand reports, wherein each demand report of the set of demand reports includes data fields common to the set of demand reports. The operations may further include extracting, from each demand report of the set of demand reports, a first subset of features from the data fields. The operations may further include generating, from the set of demand reports, a plurality of duplicate report groups, wherein each duplicate report group of the plurality of duplicate report groups comprises two or more demand reports identified as being potential duplicates based on a comparison of the first subset of features extracted from the two or more demand reports. For each duplicate report group of the plurality of duplicate report groups, the operations may further include extracting, from the two or more demand reports, a second subset of features. The operations may further include executing a trained machine learning model on the second subset of features to generate a score representing a probability that the two or more demand reports are valid duplicates. The operations may further include generating, based on a determination that the score is greater than a predefined score threshold, an audit action sequence for the duplicate report group.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 illustrates an embodiment of a method for scoring demand report groups using a trained machine learning model.

DETAILED DESCRIPTION

Businesses and organizations of any size may receive payment invoices for goods and services provided by various external or internal vendors. As business pay their vendors for the goods and services they have received, or will receive, the invoice payment may be recorded. Due to any number of complexities associated with operating a business, duplicate payments may be made for the same goods or services purchased by a business. For example, duplicate payments may occur in response to receiving duplicate invoices. Regardless of the direct cause, duplicate payments result in unnecessary expenses to a business and may negatively affect the company's bottom line or overall value. While such overpayments may be correctable if they are discovered, existing techniques for identifying such duplicate payments often rely on labor and time intensive audits of potentially thousands, if not hundreds of thousands, of records by highly skilled accountants.

In contrast, embodiments described herein provide systems and methods for training and executing a machine learning models to detect and duplicate invoice payments. By identifying and classifying potential duplicate invoice payments, also known as demand reports, the time and labor costs associated with correcting duplicate payments may be greatly reduced.

Figure 1:
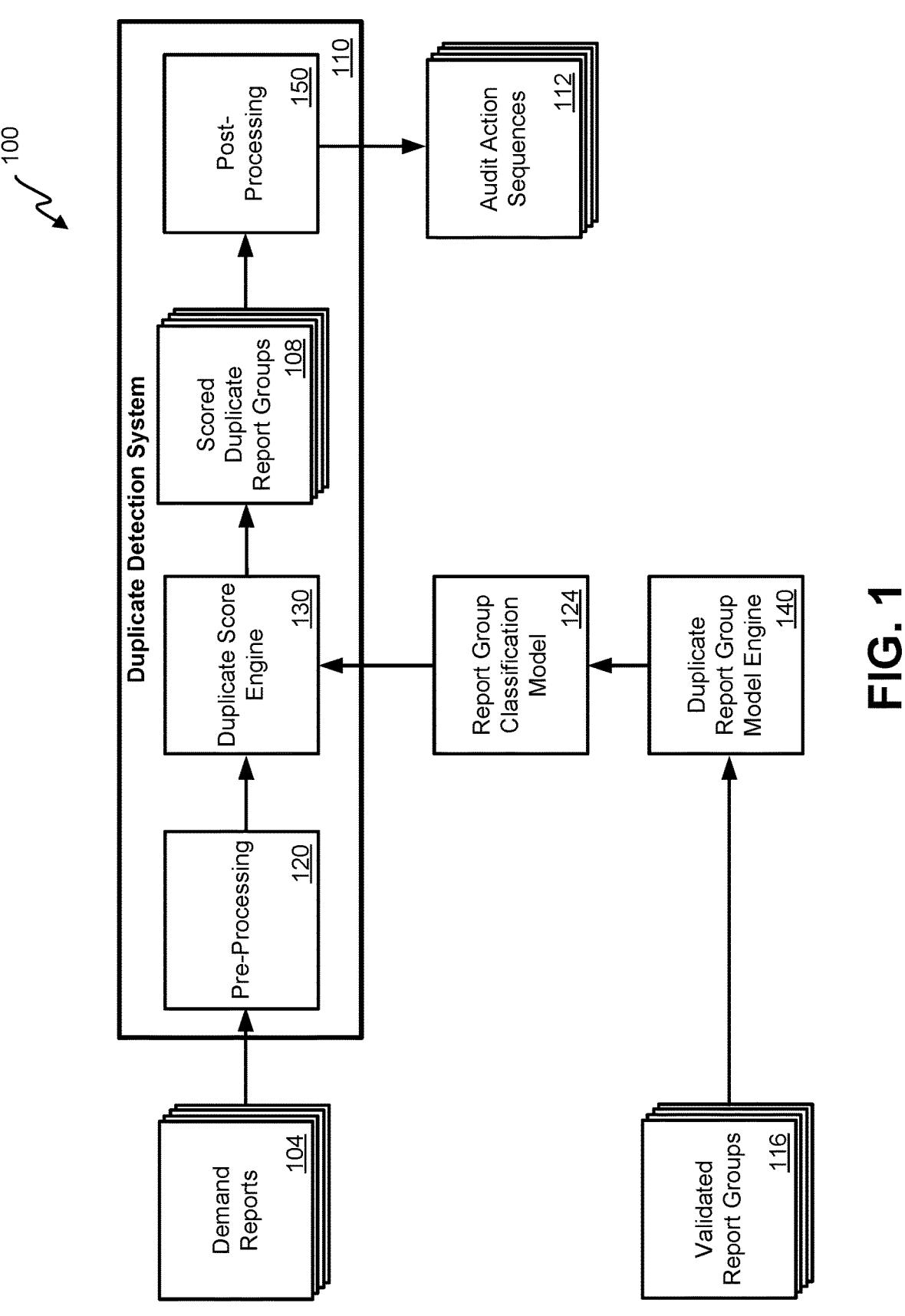
FIG. 1 illustrates an embodiment of a duplicate demand report detection system.

FIG. 1 illustrates an embodiment of a duplicate demand report detection system 100. Duplicate demand report detection system 100 can include duplicate detection system 110 and duplicate report group model engine 140. Duplicate detection system 110 and duplicate report group model engine 140 may include one or more computer systems and/or computer software applications operating on one or more computer systems. For example, duplicate detection system 110 may include one or more software applications executing on a desktop, laptop, server, or cloud-based computing platform. Duplicate detection system 110 may be configured to receive, as inputs, demand reports 104 and report group classification model 124, and generate, as an output, audit action sequences 112. In some embodiments, duplicate detection system 110 retrieves demand reports 104 from one or more external systems in communication with duplicate detection system 110.

Demand reports 104 may include a plurality of invoice payment reports for an organization, such as a business entity. Invoice payments may include payments to one or more vendors made by an organization in response to receiving invoices from the one or more vendors. For example, in response to receiving an invoice for services or goods provided by a vendor, an organization may issue one or more payments to the vendor.

In some embodiments, demand reports 104 include one or more groups of duplicate demand reports. A group of duplicate demand reports may include two or more identical and/or similar invoice payment reports. Duplicate demand reports may occur when, for example, an organization pays a vendor more than once for the same invoice. As another example, duplicate demand reports may occur when an organization receives multiple invoices for the same goods or services from a vendor and proceeds to issue invoice payments for each invoice. In other words, duplicate demand reports may occur when an organization issues multiple payments to a vendor that collectively result in an over payment for goods or services received from the vendor.

Audit action sequences 112 may be generated to identify, verify, and/or rectify potential and actual duplicate demand reports within demand reports 104. For example, audit action sequences 112 may include one or more steps, or sequences of steps, to verify that each group of potential duplicate demand reports corresponds to an overpayment by an organization for goods or services provided by the vendor to which the invoice payments within the group were made. Additionally, or alternatively, audit action sequences 112 may include one or more steps used to determine a potential amount of overpayment represented by a group of potential duplicate demand reports that have been verified. After verification and identification of the sum of the overpayment, audit action sequences 112 may include steps for issuing a claim to a particular vendor for repayment of the sum of the overpayment. In some embodiments, audit action sequences 112 include a specific arrangement or ordering of groups of potential duplicate demand reports indicating the order in which to identify, verify, and/or rectify potential duplicate invoice payments, as further described below.

Audit action sequences 112 may include information that identifies each demand report within a group of potential duplicate demand reports, such as a list of invoice payment numbers, their corresponding invoice numbers, or any other information contained in the data fields of each demand report, as further described below. In some embodiments, the identifying information may be used to locate the corresponding invoice payments, invoices, checks, wire transfers, and the like across one or more systems external to duplicate detection system 110.

After receiving demand reports 104, duplicate detection system 110 may use pre-processing 120 to identify groups of potential duplicate demand reports. Pre-processing 120 may include one or more algorithms or software components configured to compare one or more features extracted from each demand report of demand reports 104 with features from other demand reports and identify similar or matching data indicative of duplicative invoice payments. After identifying two or more demand reports with the similar or matching data, pre-processing 120 may assign the two or more demand reports to a group of potential duplicate demand reports for subsequent scoring. Pre-processing 120 may identify similar or matching data from one or more data fields common to every demand report of demand reports 104, as further described below. In some embodiments, demand reports 104 are assigned to multiple groups of potential duplicate demand reports. This may occur when, for example, data from two or more fields of a demand report is similar to, or matches with, data from two or more other demand reports that do not otherwise contain similar or matching data.

After identifying groups of potential duplicate demand reports, duplicate detection system 110 may use duplicate score engine 130 to classify, or otherwise score, each group of potential duplicate demand reports, thereby generating scored duplicate report groups 108. The classification, or score, associated with each respective group of scored duplicate report groups 108 may represent the likelihood that the respective group of potential duplicate demand reports actually corresponds to an overpayment. Additionally, or alternatively, the score may indicate a predicted likelihood of recovering an overpayment from the vendor to which the multiple invoice payments represented by the group of demand reports was made. Various methods of scoring may be used, including numerical scores (e.g., scores ranging from 0-10, 0-100, etc), letter grades (e.g., A, B, C, etc.), binary scores, and the like.

Duplicate score engine 130 may use report group classification model 124 to classify groups of potential duplicate demand reports from demand reports 104. In some embodiments, report group classification model 124 includes one or more machine learning (ML) models trained to identify, classify, and/or score groups of potential duplicate demand reports. Duplicate report group model engine 140 may generate report group classification model 124 from validated report groups 116. For example, duplicate report group model engine 140 may include one or more artificial intelligence (AI)/MHL software applications or algorithms, such as XGBoost, configured to generate predictive models, such as report group classification model 124, from training data, such as validated report groups 116. Duplicate report group model engine 140 may additionally, or alternatively, include one or more other supervised, semi-supervised, unsupervised, and/or reinforcement machine learning algorithms based on decision trees, regression trees, neural networks, and the like.

Validated report groups 116 may include one or more groups of demand reports for which one or more classifications have been previously assigned. For example, each group of demand reports in validated report groups 116 may include indications identifying each respective group as either containing one or more duplicate demand reports or not. Further indications may include whether a respective group resulted in a recovery of an overpayment resulting from the duplicate demand reports, the extent of the recover, and the like. While described as separate indications or classifications, each group may additionally, or alternatively, include a single classification or score, as described above. For example, each group may be assigned a binary score indicating whether or not the group resulted in a paid claim.

After generating scored duplicate report groups 108, duplicate detection system may use post-processing 150 to generate audit action sequences 112. Post-processing 150 may include one or more algorithms or software components configured to sort or rank scored duplicate report groups 108. For example, post-processing 150 may rank scored duplicate report groups 108 based on the classification or scores generated by duplicate score engine 130. Additionally, or alternatively, post-processing 150 may further group or sort scored duplicate report groups 108 based on one or more additional criteria, such as an amount of potential repayment represented by each group of scored duplicate report groups 108.

Figure 2:
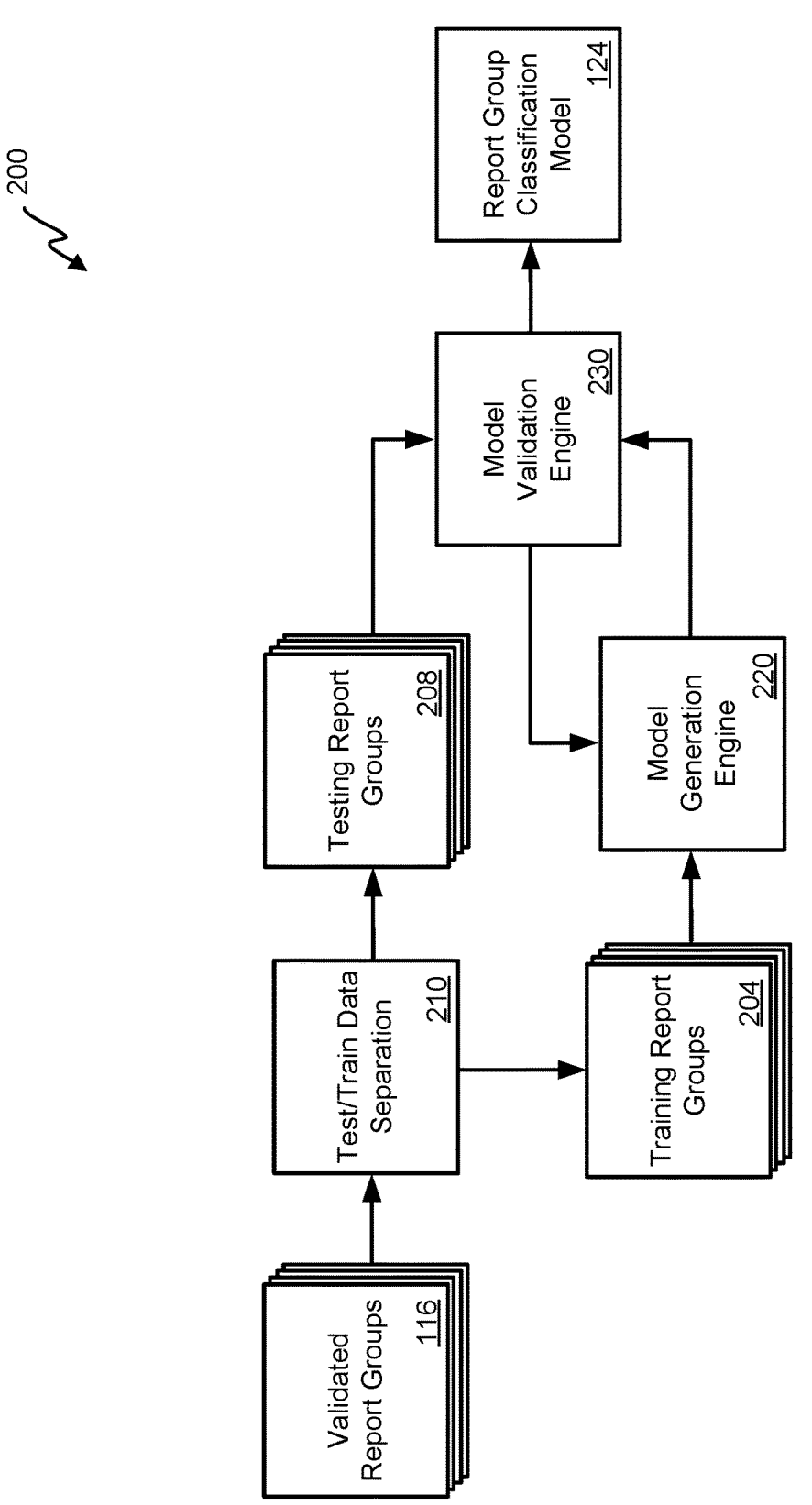
FIG. 2 illustrates an embodiment of a system for generating machine learning models trained to detect duplicate demand reports.

FIG. 2 illustrates an embodiment of a system 200 for generating machine learning models trained to detect duplicate demand reports. System 200 may include model generation engine 220 and model validation engine 230. One or more components of system 200 may be implemented as a software process or application operating on a single or distributed computer system, such as a laptop, desktop, server, or cloud-based computing system. System 200 may generate AI/ML models, such as report group classification model 124, trained to classify groups of potential duplicate demand reports.

Validated report groups 116 may be used to train report group classification model 124. As described above, validated report groups 116 may include one or more groups of demand reports for which one or more classifications have been previously assigned. For example, validated report groups 116 may include a first subset of groups that do not represent valid claims for overpayment and a second subset of groups that do represent valid claims for overpayment. In some embodiments, the percentage of report groups in the first subset of validated report groups 116 that do not represent a valid claim is 5% while the percentage of report groups in the second subset of validated report groups 116 that do represent a valid claim is 95%. Validated report groups 116 may further include a third subset of groups from the second subset of groups that do represent valid claims and were ultimately successful in resulting in a paid claim.

As illustrated, test/train data separation 210 may initially separate validated report groups 116 into training report groups 204 and testing report groups 208. In some embodiments, test/train data separation 210 separates validated report groups 116 evenly between training report groups 204 and testing report groups 208. When separating validated report groups 116, test/train data separation 210 may distribute each validated report group of validated report groups 116 between training report groups 204 and testing report groups 208 at random. Alternatively, test/train data separation 210 may be configured to ensure that training report groups 204 and testing report groups 208 each receive an equal distribution of each type of classification contained within validated report groups 116.

Model generation engine 220 may use features extracted from training report groups 204, as described further below, to generate and/or train an initial ML classification model. Model generation engine 220 may use any one, or a combination of, supervised, semi-supervised, unsupervised, or reinforced learning, to generate and/or train the initial ML classification model. Subsequently, model validation engine 230 may apply the initial ML classification model from model generation engine 220 to testing report groups 208 to generate new classifications for each report group of testing report groups 208. The new classifications may include the same and/or other types of classifications than the previously assigned classifications from validated report groups 116. For example, while the previously assigned classifications may be a binary type classification, such as "claim" and "no claim", the new classifications may include a range of classifications, such as a probability that a particular report group of testing report groups 208 will result in a claim, or a probability that a particular report group of testing report groups 208 will result in a paid claim.

Using the new classifications and the previously assigned classifications, model validation engine 230 may determine an accuracy for the initial ML classification model generated by model generation engine 220. For example, model validation engine 230 may initially sort the testing report groups 208 in descending order based on the new classifications (e.g., from highest score to lowest score). Model validation engine 230 may then evaluate the hit rate (e.g., the percentage of groups representing valid claims) within each quintile, decile, quartile, or other suitable range of classifications. The hit rate within each range of classifications may then be compared against a hypothetical random classification hit rate to determine the performance of the initial ML classification model.

Based at least in part on the accuracy determined by model validation engine 230 for the initial ML classification model, model generation engine 220 may generate a subsequent ML classification model. Model generation engine 220 may generate the subsequent ML classification model using the same features from the initial ML classification model, for example adjusting the importance associated with each features, a new combination of features, or some combination of new features and old features, as described in further detail below. In this way, model generation engine

220 and model validation engine 230 may iteratively create and modify ML classification models using training report groups 204 and testing report groups 208 until model generation engine 220 is able to generate a ML classification model that meets or exceeds a predefined accuracy threshold, such as report group classification model 124.

Figure 3:
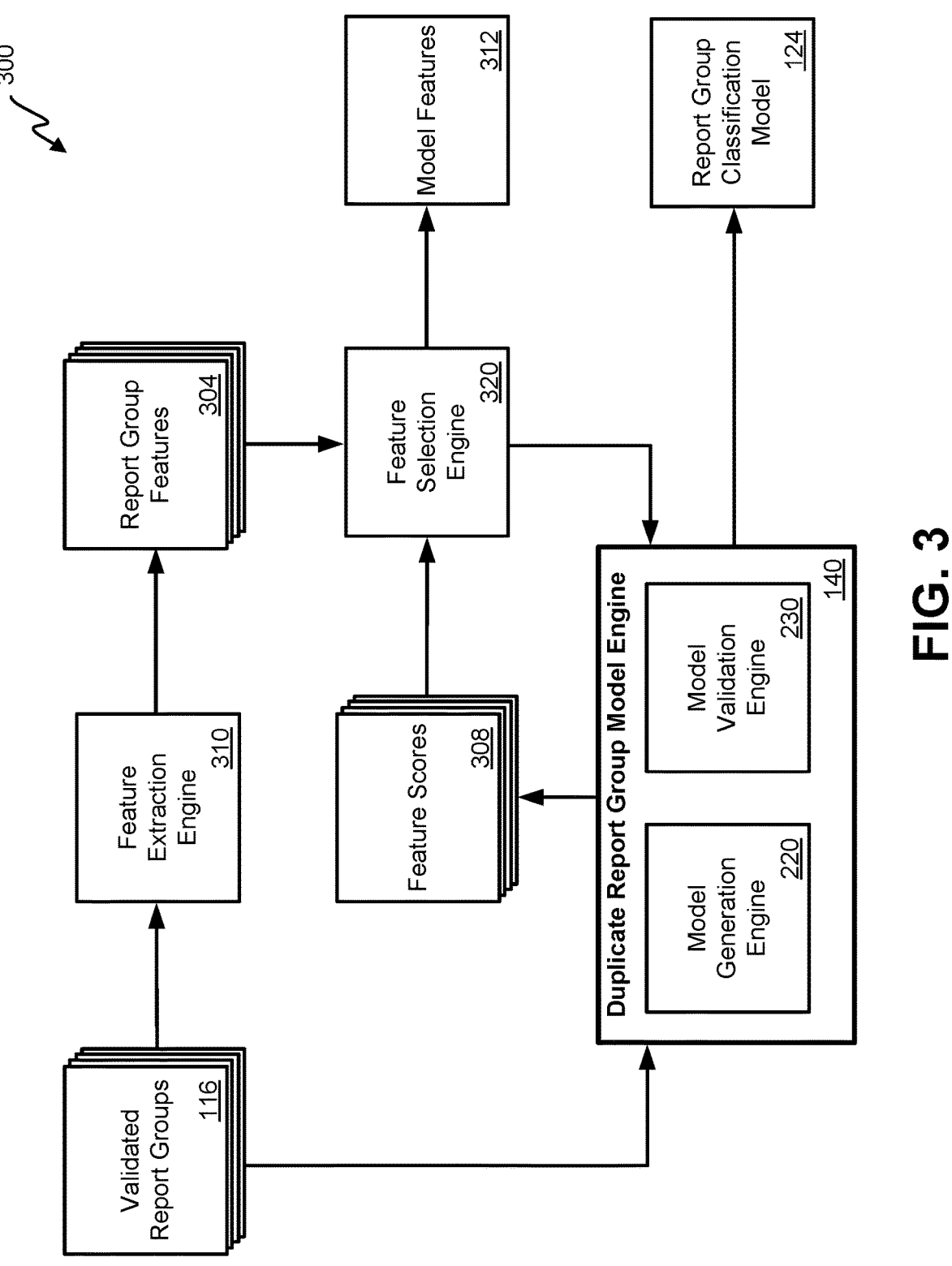
FIG. 3 illustrates an embodiment of a system for selecting predictive features from report groups for detecting duplicate demand reports.

FIG. 3 illustrates an embodiment of a system 300 for selecting predictive features from report groups for detecting duplicate demand reports. As illustrated, system 300 may include some or all of the same components described in reference to system 100 and/or system 200 above. For example, system 300 may include duplicate report model engine 140 comprising model generation engine 220 and model validation engine 230. Similarly, such components may be configured to perform the same, or similar, operations as described above. For example, model generation engine 220 and model validation engine 230 may function in combination to generate report group classification model 124 from validated report groups 116.

As described above, report group classification model 124 may include a plurality of model features 312 and associated feature scores 308. Feature scores 308 may include numerical or other indications of the overall importance or relevance of each feature to a classification model and/or the weight assigned to each particular feature. Each feature of model features 312 may correspond to an individual measurable property or characteristic common to individual reports and/or groups of reports. Model features 312 may be a subset of features selected from a larger superset of available features. The superset of available features may be extracted from a collection of demand reports. For example, as illustrated, feature extraction engine 310 may extract report group features 304 from validated report groups 116. Feature selection engine 320 may then supplement or function in combination with duplicate report model engine 140 to select model features 312 from report group features 304 that result in report group classification model 124 producing a classification accuracy at or above a predefined threshold accuracy, as described above.

For example, feature selection engine 320 may select an initial subset of features from report group features 304 and provide the features to model generation engine 220. Model generation engine 220 may then generate the initial ML classification model using the initial subset of features by assigning an initial score to each feature of the initial subset of features. Model validation engine 230 may then evaluate the initial ML classification model for accuracy, as described above. Based on the evaluated accuracy of the initial ML classification model, feature selection engine 320 may use the initial scores to select a subsequent subset of features. For example, feature selection engine 320 may retain the features from the initial subset of features that received an initial score above a predefined threshold score and replace or remove the features from the initial subset of features that received an initial score below the predefined threshold score. In this way, feature selection engine 320 and duplicate report model engine 140 may work in combination to iteratively select subsequent subsets of features from report group features 304 and generate subsequent ML classification models until a final ML classification model is generated based on a final subset of features with associated scores. The final ML classification model may then be output as report group classification model 124 including model features 312 and feature scores 308.

Report group features 304 may include a plurality of features corresponding to fields common to each demand report of validated report groups 116. For example, feature extraction engine 310 may identify features from fields including: invoice number; invoice date; vendor number; address sequence number; vendor name; gross invoice amount; payment method; check number; check date; check amount; company code; document number; document type; description; user name; posting date; payment document number; purchase order (PO) number; void indicator; void date; void reason; discount percent; discount amount; payment terms; voucher number; batch number; absolute amount; VID; ID; raw data PK; clearing date; paying company code; replacement check number; fiscal year; currency key; fiscal period; sales tax code; purchasing document number; gross invoice amount; local sales tax amount; discount base amount; one or more flex fields; and/or a reversal indicator.

Report group features 304 may additionally, or alternatively, include features based on a cumulative and/or statistical analysis of data from validated report groups 116. For example, report group features 304 may include deviations from statistical values (e.g., mean, mode, median, skew, etc.) observed in each field described above. For example, report group features 304 may include a feature corresponding to a deviation from the average alphanumeric distribution within invoice numbers (e.g., ratio of numbers to letters, percent composition of letters and the like) observed from each invoice number within validated report groups 116. As another example, report group features 304 may include one or more features corresponding to the deviation from average values, such as the deviation from an average invoice amount or payment amount observed within validated report groups 116 and/or a subset of validated report groups 116 corresponding to invoices from a particular vendor. Other examples of features based on statistical measurements may include: the difference between a highest and lowest payment document number; the elapsed time between an invoice date and a post date; the deviation from an average invoice length (e.g., by vendor); the percent of invoices within a report group that contain a dash in the invoice number; the proportion of unique check numbers to the number of invoices in a report group; and the like.

Figure 4:
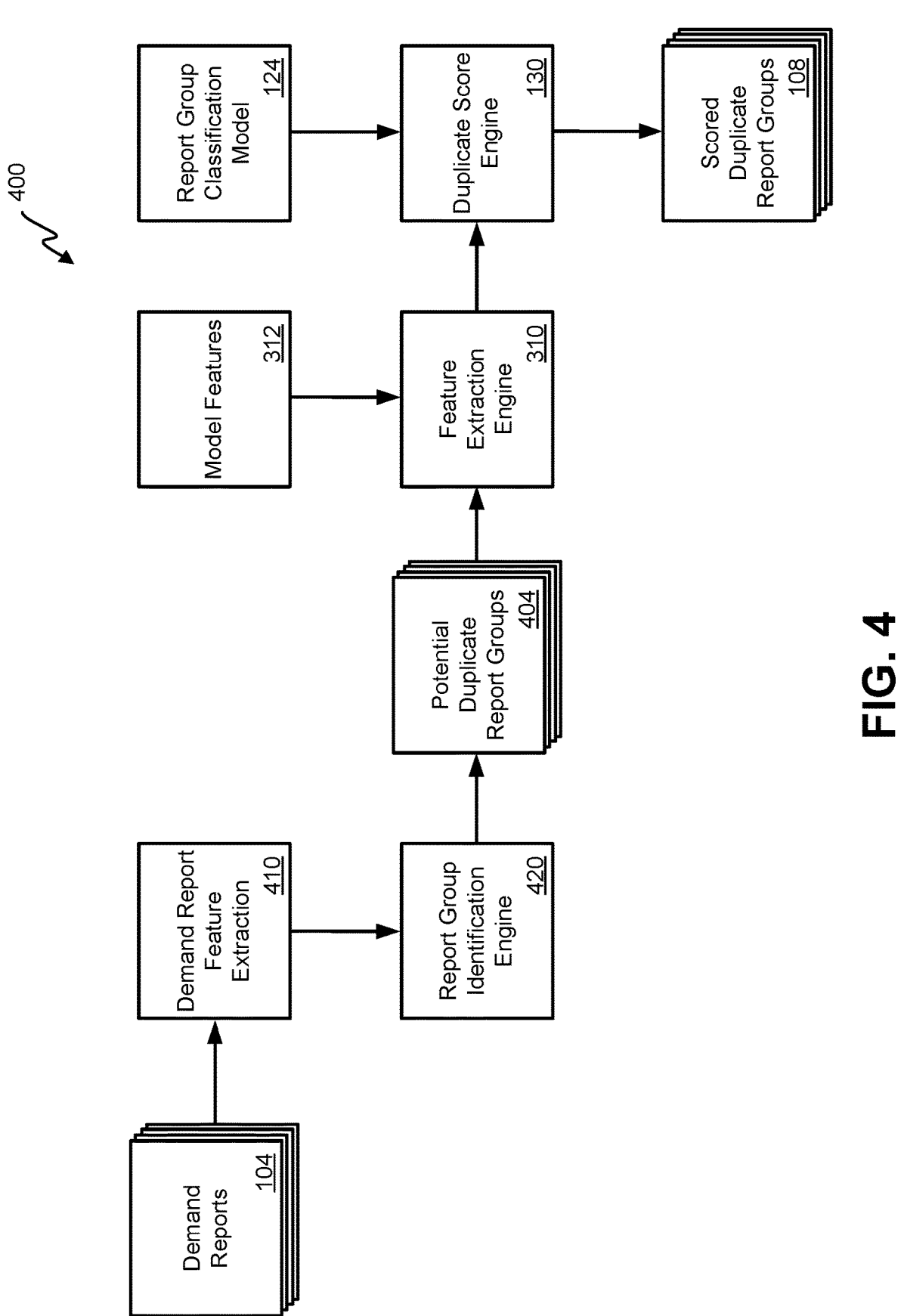
FIG. 4 illustrates an embodiment of a system for scoring demand report groups using a trained machine learning model.

FIG. 4 illustrates an embodiment of a system 400 for scoring demand report groups using a trained machine learning model. In some embodiments, system 400 is the same, and/or functions in a similar manner, as duplicate detection system 110 described above. For example, system 400 may receive demand reports 104 and produce scored duplicate report groups 108. While not illustrated, system 400 may subsequently perform post-processing 150 to produce audit action sequences 112, as further described above.

As illustrated, system 400 may include some of the same components described above in reference to system 100 and/or system 300. For example, system 400 may include duplicate score engine 130 and feature extraction engine 310. Similarly, such components may be configured to perform the same, or similar, functions as described above. For example, duplicate score engine 130 may use report group classification model 124 to classify groups of potential duplicate report groups 404 identified from demand reports 104 thereby generating scored duplicate report groups 108, as described further below. As another example, feature extraction engine 310 may extract features from demand reports, and/or groups of demand reports, in potential duplicate report groups 404 for use by duplicate score engine 130.

In addition, one or more components, and their associated functionalities, described above in reference to system 200 and/or system 300 may be used in support of system 400.

For example, duplicate report model engine 140 and/or feature selection engine 320 may be used to generate report group classification model 124, and/or model features 312, for use by duplicate score engine 130 and/or feature extraction engine 310.

As described above in reference to pre-processing 120, system 400 may initially use demand report feature extraction 410 and report group identification engine 420 to identify potential duplicate report groups 404 from demand reports 104. For example, demand report feature extraction 410 may initially extract, from each demand report of demand reports 104, a first subset of features from data fields common to each demand report of demand reports 104. In some embodiments, the first subset of features extracted from each demand report is a subset of features included in report group classification model 124 and/or model features 312, as described above. For example, the first subset of features may be limited to one, or a combination of, a vendor identification data field, an invoice date data field, an invoice number data field, and an invoice amount data field.

Report group identification engine 420 may be configured to generate each report group of potential duplicate report groups 404 based on a comparison of the first subset of features extracted from two or more demand reports by demand report features extraction 410. For example, after identifying two or more demand reports with at least one matching or similar feature, report group identification engine 420 may group the two or more demand reports into a potential duplicate report group.

After identifying potential duplicate report groups 404, feature extraction engine 310 may extract, for each duplicate report group of potential duplicate report groups 404, a second subset of features. The second subset of features extracted by feature extraction engine 310 may be based on model features 312. For example, feature extraction engine 310 may limit the second subset of features extracted from each duplicate report group of potential duplicate report groups 404 to the features included in model features 312 that correspond to the features included in report group classification model 124. Additionally, or alternatively, feature extraction engine 310 may perform one or more statistical analyses on demand reports 104 based on the features included in model features 312 prior to extracting the second subset of features from each duplicate report group. For example, as described above, feature extraction engine 310 may calculate the average invoice amount per vendor included in demand reports 104 based on a corresponding invoice amount deviation feature included in model features 312. As another example, feature extraction engine 310 may determine the average alphanumeric distribution within each invoice number per vendor based on a corresponding invoice number distribution deviation feature included in model features 312.

After the second subset of features have been extracted for a report group of potential duplicate report groups 404 by feature extraction engine 310, duplicate score engine 130 may execute report group classification model 124 on the second subset of features to generate a score representing the probability that the two or more demand reports within the report group are duplicates. As described above, the score may include a probability that the report group will result in a valid claim for repayment and/or a successful repayment of an overpayment. Duplicate score engine 130 may assign a score to each report group of potential duplicate report groups 404, thereby generating scored duplicate report groups 108.

Various methods may be performed using the systems and arrangements of FIGS. 1-5. FIG. 5 illustrates an embodiment of a method 500 for scoring demand report groups using a trained machine learning model. Method 500 may be performed by duplicate detection system 110, described above. One or more blocks of method 500 may be performed by one or more computers, such as a laptop, desktop, server, or cloud-based server system.

At block 504, a set of demand reports may be received. The set of demand reports may include a plurality of invoice payment reports for an organization, such as a business entity. Each demand report of the set of demand reports may include data fields common to the set of demand reports, such as invoice numbers, vendor IDs, payment amounts, and the like. The set of demand reports may be received at a computer system, as described below. In some embodiments, the set of demand reports are imported into a computer system from an external system, such as from a payment processing platform used to process and manage invoice payments to multiple vendors of an organization. In some embodiments, the set of demand reports are sorted based on the vendors to which the payments were made. Alternatively, the set of demand reports may be sorted by vendor before proceeding to block 508 of method 500.

At block 508, a first subset of features may be extracted from each demand report of the set of demand reports. In some embodiments, the first subset of features include a vendor identification data field, an invoice date data field, an invoice number data field, and an invoice amount data field. The first subset of features may be common to each demand report of the set of demand reports. In some embodiments, a feature extraction engine, such as feature extraction engine 310 described above, extracts the first subset of features from each demand report of the set of demand reports.

At block 512, a plurality of duplicate report groups may be generated from the set of demand reports. Each report group of the plurality of duplicate report groups may include two or more demand reports from the set of demand reports identified as being potential duplicates. In some embodiments, identifying two or more demand reports as being potential duplicates is based on a comparison of the first subset of features extracted from each demand report of the two or more demand reports. For example, at least one feature of the first subset of features from the two or more demand reports may be identified as containing similar and/or matching data. Based on the identification of matching data, the two or more demand reports may be identified as potential duplicates of each other and grouped into the same duplicate report group. In some embodiments, grouping two or more demand reports in the same duplicate report group includes assigning a unique identifier of the respective report group to each demand report.

At block 516, a second subset of features from the two or more demand reports may be extracted for each duplicate report group. In some embodiments, the second subset of features are based on features included in a trained ML classification model. For examples, the second subset of features may be selected from a superset of features available from the set of demand reports based on ML classification model training process, as described above in reference to FIG. 2 and FIG. 3.

At block 520, a trained machine learning model may be executed on the second subset of features extracted from each duplicate report group. In some embodiments, the trained machine learning model is configured to generate a score representing the probability that the two or more demand reports in a particular duplicate report group are valid duplicates and/or that they represent a valid claim for repayment, as described above in reference to FIG. 1.

At block 524, an audit action sequence may be generated for each duplicate report group. Each audit action sequence may include information that identifies the respective demand reports within a group of potential demand reports, such as a list of invoice numbers. Additionally, or alternatively, an audit action sequence may include one or more steps for verifying that the two or more demand reports in the associated duplicate report group are valid duplicates of each other. In some embodiments, audit action sequences are generated based on a determination that the score associated with the duplicate report group is greater than a predefined score threshold. Additionally, or alternatively, audit action sequences are generated based on a ranking of the duplicate report groups by their scores.

Figure 6:
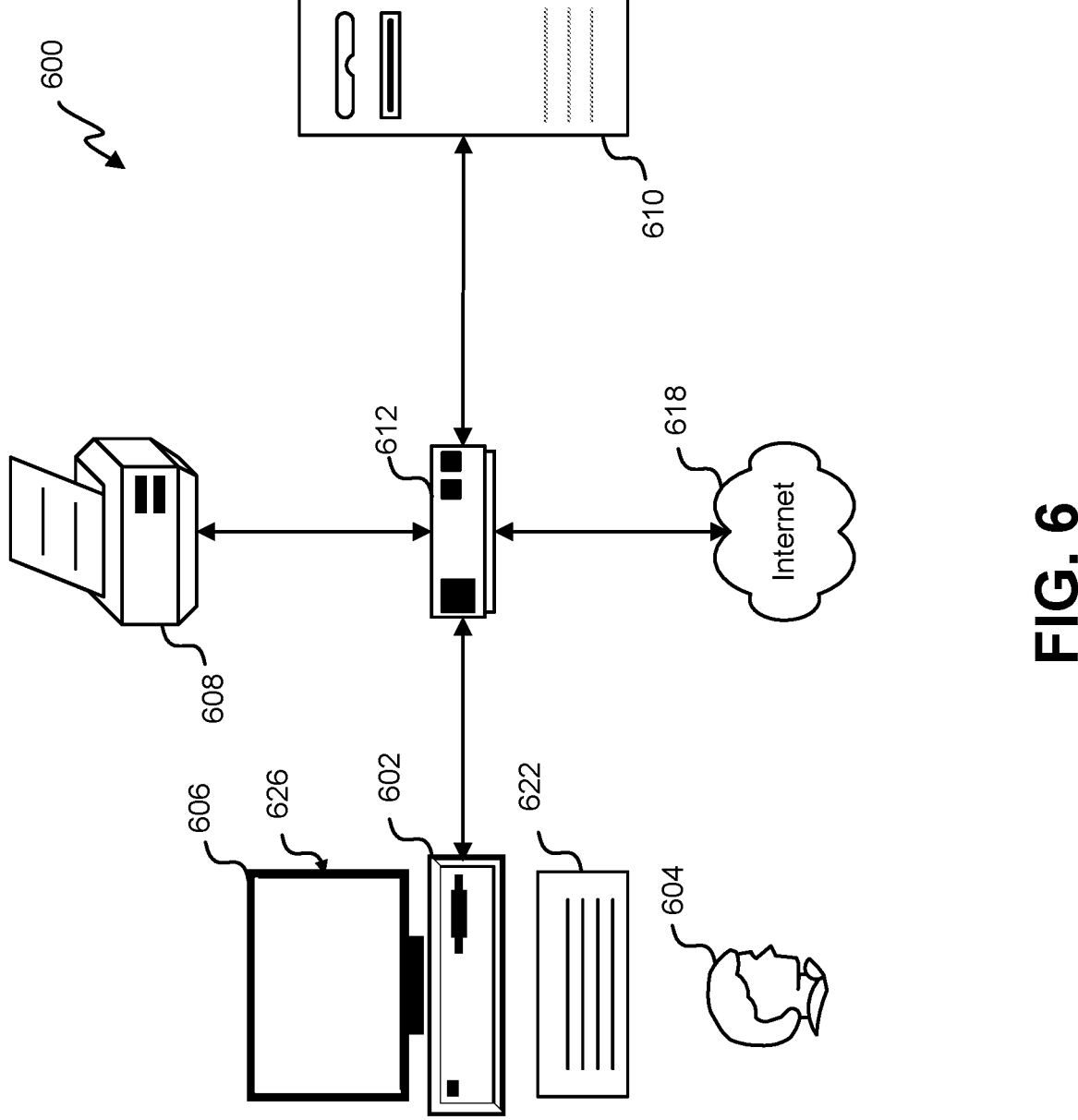
FIG. 6 illustrates an exemplary environment in which embodiments may be implemented, according to some embodiments.

FIG. 6 illustrates an exemplary environment 600 in which embodiments may be implemented, according to some embodiments. Embodiments may be implemented in a computer system 600 that can be used by a designer 604 to design, for example, electronic designs. The computer system 610 can include a computer 602, an optional keyboard 622, a network router 612 or other routing fabric, an optional printer 608, and an optional monitor 606. The monitor 606, processor 602 and keyboard 622 are part of a computer system 626, which can be a laptop computer, desktop computer, handheld computer, rack-mounted computer, mainframe computer, etc. The monitor 606 can be a CRT, flat screen, remote terminal, etc.

A designer 604 can input commands into the computer 602 using various input devices, such as a mouse, keyboard 622, track ball, touch screen, etc. If the computer system 600 comprises a mainframe, a designer 604 can access the computer 602 using, for example, a terminal or terminal interface. Additionally, the computer system 626 may be connected to a printer 608 and a server 610 using a network router 612, which may connect to the Internet 618 or a WAN.

The server 610 may, for example, be used to store additional software programs and data. In one embodiment, software implementing the systems and methods described herein can be stored on a storage medium in the server 610. Thus, the software can be run from the storage medium in the server 610. In another embodiment, software implementing the systems and methods described herein can be stored on a storage medium in the computer 602. Thus, the software can be run from the storage medium in the computer system 626. Therefore, in this embodiment, the software can be used whether or not computer 602 is connected to network router 612. Printer 608 may be connected directly to computer 602, in which case, the computer system 626 can print whether or not it is connected to network router 612.

Figure 7:
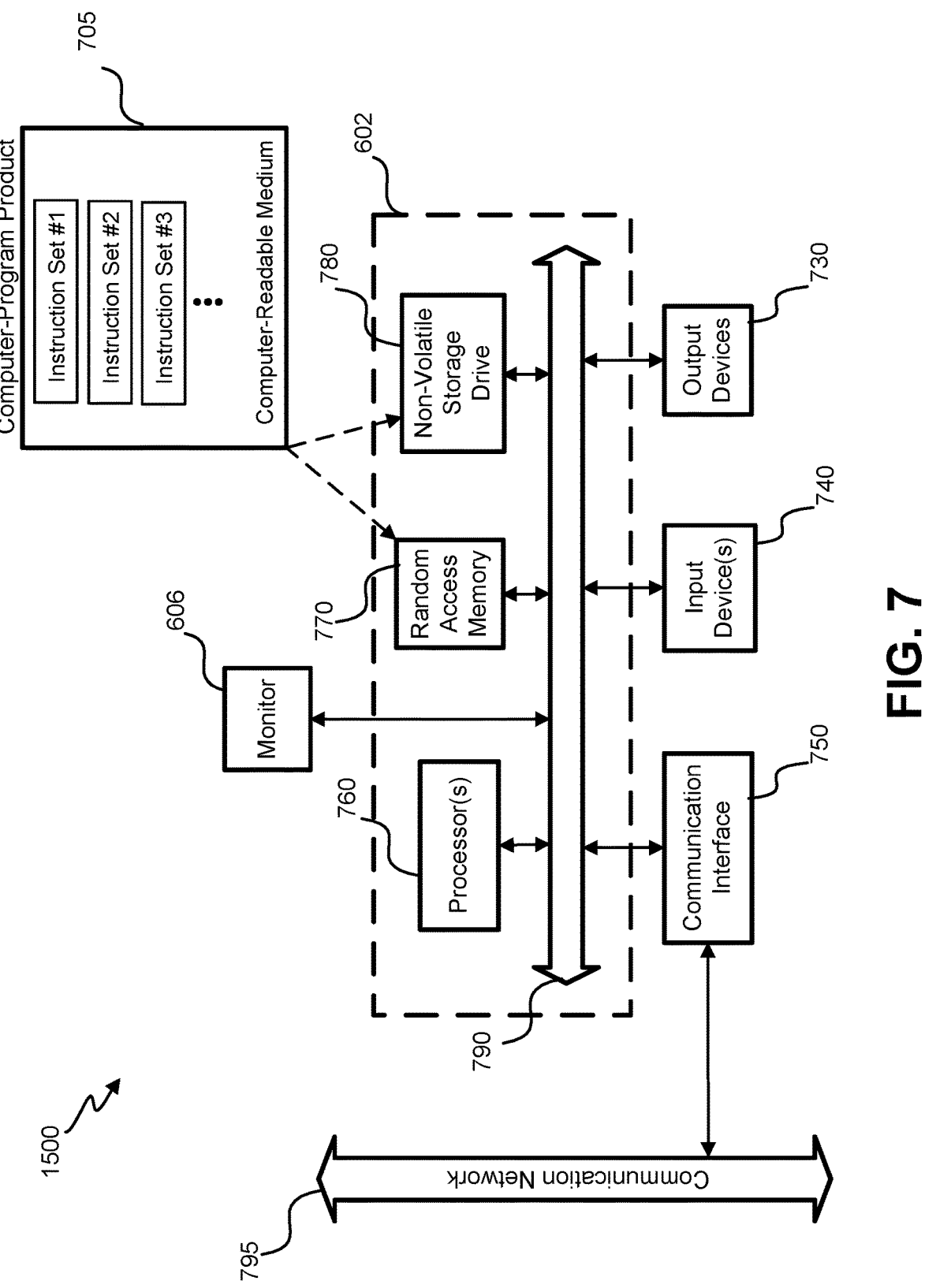
FIG. 7 illustrates an embodiment of a special-purpose host computer system, according to some embodiments.

FIG. 7 illustrates an embodiment of a special-purpose host computer system 700, according to some embodiments. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose host computer system 700.

Special-purpose host computer system 700 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs host computer system 600 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 602 and loaded into memory 770. Each processor 760 may comprise a microprocessor, such as a microprocessor from Intel® or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft® Corporation, Solaris® from Oracle®, LINUX, UNIX, and the like.

User input devices 740 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These may include a display (e.g., monitor 606), printers, non-visual displays such as audio output devices, etc.

Communications interface 750 provides an interface to other communication networks and devices and may serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem may utilize multiple busses or communication paths within the computer 602.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method comprising:

obtaining a plurality of validated report groups, wherein each validated report group of the plurality of validated report groups is associated with a respective classification of a plurality of classifications indicating whether or not a validated report group includes one or more duplicate demand reports;

extracting, from each validated report group of the plurality of validated report groups, a plurality of features;

selecting a subset of features from the plurality of features;

training a new machine learning model on the subset of features and the respective classification from each validated report group of the plurality of validated report groups, wherein, once trained, the new machine learning model comprises a predictive power value assigned by the new machine learning model to each feature of the subset of features;

determining that an accuracy of the new machine learning model does not meet or exceed a predefined accuracy threshold;

selecting, in response to determining that the accuracy of the new machine learning model does not meet or exceed the predefined accuracy threshold, a subsequent subset of features from the plurality of features by:

retaining first features from the subset of features that were assigned predictive power values above a predefined predictive power threshold by the new machine learning model; and replacing second features from the subset of features that were assigned predictive power values below the predefined predictive power threshold by the new machine learning model;

training a subsequent machine learning model on the subsequent subset of features and the respective classification from each validated report group of the plurality of validated report groups;

determining that an accuracy of the subsequent machine learning model meets or exceeds the predefined accuracy threshold;

outputting, in response to determining that the accuracy of the subsequent machine learning model meets or exceeds the predefined accuracy threshold, the subsequent machine learning model as a final machine learning model;

identifying, in further response to determining that the accuracy of the subsequent machine learning model meets or exceeds the predefined accuracy threshold, the subsequent subset of features as a final subset of features;

receiving a set of demand reports, wherein each demand report of the set of demand reports includes data fields common to the set of demand reports;

extracting, from each demand report of the set of demand reports, a first subset of features from the data fields;

generating, from the set of demand reports, a plurality of duplicate report groups, wherein each duplicate report group of the plurality of duplicate report groups comprises two or more demand reports identified as being potential duplicates based on a comparison of the first subset of features extracted from the two or more demand reports; and for each duplicate report group of the plurality of duplicate report groups;

extracting, from the two or more demand reports, a second subset of features corresponding to the final subset of features;

executing the final machine learning model on the second subset of features to generate a score representing a probability that the two or more demand reports are valid duplicates; and generating, based on a determination that the score is greater than a predefined score threshold, an audit action sequence for the duplicate report group.

2. The method of claim 1, wherein the first subset of features are extracted from data fields comprising: a vendor identification data field, an invoice date data field, an invoice number data field, and an invoice amount data field.

3. The method of claim 1, wherein each demand report of the set of demand reports is associated with a respective vendor of a plurality of vendors, and wherein the method further comprises:

generating, for each respective vendor of the plurality of vendors, a respective vendor profile comprising a plurality of statistical features extracted from the demand reports associated with the respective vendor.

4. The method of claim 3, wherein each duplicate report group of the plurality of duplicate report groups is associated with a respective vendor of the plurality of vendors and the second subset of features comprises one or more deviations from the plurality of statistical features of the respective vendor profile.

5. The method of claim 3, wherein the plurality of statistical features comprises at least one statistical feature selected from the group consisting of: an average invoice length, an average invoice number, a prevalence of dashes in invoice numbers, and an average invoice number length.

6. The method of claim 1, further comprising:

training, for each iteration, the new machine learning model using a subset of the plurality of validated report groups; and verifying, for each iteration, the accuracy of the new machine learning model using a remainder of the plurality of validated report groups and the associated plurality of classifications.

7. A computer system including:

one or more processors; and one or more memories storing computer-readable instructions that, upon execution by the one or more processors, configure the computer system to:

obtain a plurality of validated report groups, wherein each validated report group of the plurality of validated report groups is associated with a respective classification of a plurality of classifications indicating whether or not a validated report group includes one or more duplicate demand reports;

extract, from each validated report group of the plurality of validated report groups, a plurality of features;

select a subset of features from the plurality of features;

train a new machine learning model on the subset of features and the respective classification from each validated report group of the plurality of validated report groups, wherein, once trained, the new machine learning model comprises a predictive power value assigned by the new machine learning model to each feature of the subset of features;

determine that an accuracy of the new machine learning model does not meet or exceed a predefined accuracy threshold;

select, in response to determining that the accuracy of the new machine learning model does not meet or exceed the predefined accuracy threshold, a subsequent subset of features from the plurality of features by:

retaining first features from the subset of features that were assigned predictive power values above a predefined predictive power threshold by the new machine learning model; and replacing second features from the subset of features that were assigned predictive power values below the predefined predictive power threshold by the new machine learning model;

train a subsequent machine learning model on the subsequent subset of features and the respective classification from each validated report group of the plurality of validated report groups;

determining that an accuracy of the subsequent machine learning model meets or exceeds the predefined accuracy threshold;

output, in response to determining that the accuracy of the subsequent machine learning model meets or exceeds the predefined accuracy threshold, the subsequent machine learning model as a final machine learning model;

identify, in further response to determining that the accuracy of the subsequent machine learning model meets or exceeds the predefined accuracy threshold, the subsequent subset of features as a final subset of features;

receive a set of demand reports, wherein each demand report of the set of demand reports includes data fields common to the set of demand reports;

extract, from each demand report of the set of demand reports, a first subset of features from the data fields;

generate, from the set of demand reports, a plurality of duplicate report groups, wherein each duplicate report group of the plurality of duplicate report groups comprises two or more demand reports identified as being potential duplicates based on a comparison of the first subset of features extracted from the two or more demand reports; and for each duplicate report group of the plurality of duplicate report groups;

extract, from the two or more demand reports, a second subset of features corresponding to the final subset of features;

execute the final machine learning model on the second subset of features to generate a score representing a probability that the two or more demand reports are valid duplicates; and generate, based on a determination that the score is greater than a predefined score threshold, an audit action sequence for the duplicate report group.

8. The computer system of claim 7, wherein the computer-readable instructions further configure the computer system to obtain the set of demand reports from one or more external computer systems.

9. The computer system of claim 7, wherein the audit action sequence includes one or more procedures to determine a duplicate amount represented by the duplicate report group, and the computer-readable instructions further configure the computer system to:

present, at a display communicatively coupled with the computer system, the one or more procedures to a user.

10. The computer system of claim 7, wherein the first subset of features are extracted from data fields comprising: a vendor identification data field, an invoice date data field, an invoice number data field, and an invoice amount data field.

11. The computer system of claim 7, wherein each demand report of the set of demand reports is associated with a respective vendor of a plurality of vendors, and the computer-readable instructions further configure the computer system to:

generate, for each respective vendor of the plurality of vendors, a respective vendor profile comprising a plurality of statistical features extracted from the demand reports associated with the respective vendor.

12. The computer system of claim 11, wherein each duplicate report group of the plurality of duplicate report groups is associated with a respective vendor of the plurality of vendors and the second subset of features comprises one or more deviations from the plurality of statistical features of the respective vendor profile.

13. The computer system of claim 11, wherein the plurality of statistical features comprises at least one statistical feature selected from the group consisting of: an average invoice length, an average invoice number, a prevalence of dashes in invoice numbers, and an average invoice number length.

14. One or more non-transitory computer-readable storage media storing instructions that, upon execution on a computer system, cause the computer system to perform operations including:

obtaining a plurality of validated report groups, wherein each validated report group of the plurality of validated report groups is associated with a respective classification of a plurality of classifications indicating whether or not a validated report group includes one or more duplicate demand reports;

extracting, from each validated report group of the plurality of validated report groups, a plurality of features;

selecting a subset of features from the plurality of features;

training a new machine learning model on the subset of features and the respective classification from each validated report group of the plurality of validated report groups, wherein, once trained, the new machine learning model comprises a predictive power value assigned by the new machine learning model to each feature of the subset of features;

determining that an accuracy of the new machine learning model does not meet or exceed a predefined accuracy threshold;

selecting, in response to determining that the accuracy of the new machine learning model does not meet or exceed the predefined accuracy threshold, a subsequent subset of features from the plurality of features by:

retaining first features from the subset of features that were assigned predictive power values above a predefined predictive power threshold by the new machine learning model; and replacing second features from the subset of features that were assigned predictive power values below the predefined predictive power threshold by the new machine learning model;

training a subsequent machine learning model on the subsequent subset of features and the respective classification from each validated report group of the plurality of validated report groups;

determining that an accuracy of the subsequent machine learning model meets or exceeds the predefined accuracy threshold;

outputting, in response to determining that the accuracy of the subsequent machine learning model meets or exceeds the predefined accuracy threshold, the subsequent machine learning model as a final machine learning model;

identifying, in further response to determining that the accuracy of the subsequent machine learning model meets or exceeds the predefined accuracy threshold, the subsequent subset of features as a final subset of features;

receiving a set of demand reports, wherein each demand report of the set of demand reports includes data fields common to the set of demand reports;

extracting, from each demand report of the set of demand reports, a first subset of features from the data fields;

generating, from the set of demand reports, a plurality of duplicate report groups, wherein each duplicate report group of the plurality of duplicate report groups comprises two or more demand reports identified as being potential duplicates based on a comparison of the first subset of features extracted from the two or more demand reports; and for each duplicate report group of the plurality of duplicate report groups;

extracting, from the two or more demand reports, a second subset of features corresponding to the final subset of features;

executing the final machine learning model on the second subset of features to generate a score representing a probability that the two or more demand reports are valid duplicates; and generating, based on a determination that the score is greater than a predefined score threshold, an audit action sequence for the duplicate report group.

15. The one or more non-transitory computer-readable storage media of claim 14, wherein the first subset of features are extracted from data fields comprising: a vendor identification data field, an invoice date data field, an invoice number data field, and an invoice amount data field.

16. The one or more non-transitory computer-readable storage media of claim 14, wherein each demand report of the set of demand reports is associated with a respective vendor of a plurality of vendors, and the operations further include:

generating, for each respective vendor of the plurality of vendors, a respective vendor profile comprising a plurality of statistical features extracted from the demand reports associated with the respective vendor.

17. The one or more non-transitory computer-readable storage media of claim 16, wherein each duplicate report group of the plurality of duplicate report groups is associated with a respective vendor of the plurality of vendors and the second subset of features comprises one or more deviations from the plurality of statistical features of the respective vendor profile.

18. The one or more non-transitory computer-readable storage media of claim 16, wherein the plurality of statistical features comprises at least one statistical feature selected from the group consisting of: an average invoice length, an average invoice number, a prevalence of dashes in invoice numbers, and an average invoice number length.

* * * * *